Patented Apr. 20, 1954

2,676,175

UNITED STATES PATENT OFFICE 2,676,175

PROCESS FOR MANUFACTURING THIAMINE

Shigeru Yoshida and Makoto Unoki, Tokyo, Japan, assignors to Sankyo Kabushiki Kaisha, Tokyo, Japan, a corporation of Japan No Drawing. Application February 18, 1953, Serial No. 337,692

Claims priority, application Japan March 15, 1952

2 Claims. (Cl. 260—256.6)

This invention relates to a process for manufacturing thiamine.

According to the present invention the product aimed at is obtained in a very pure state and at a good yield by a simpler and more inexpensive manner than by hitherto known processes. It is therefore considered that the present invention provides an entirely novel process for manufacturing this substance.

The process of the present invention is comprised of splitting off hydrogen halide from 2'-methyl-2'-halogeno - tetrahydrofuryl-(3')-[2-alkyl-4-amino-pyrimidyl - (5)] - methyl-dithiocarbamate (I) to produce 2'-methyl-4':5'-dihydrofuryl - (3') - [2-alkyl- 4 -amino-pyrimidyl - (5) ]-methyl-dithiocarbamate (II) and oxidizing the latter in an acid solution with hydrogen peroxide to thiamine derivative (III). The reactions which take place may be illustrated by the following formulae:

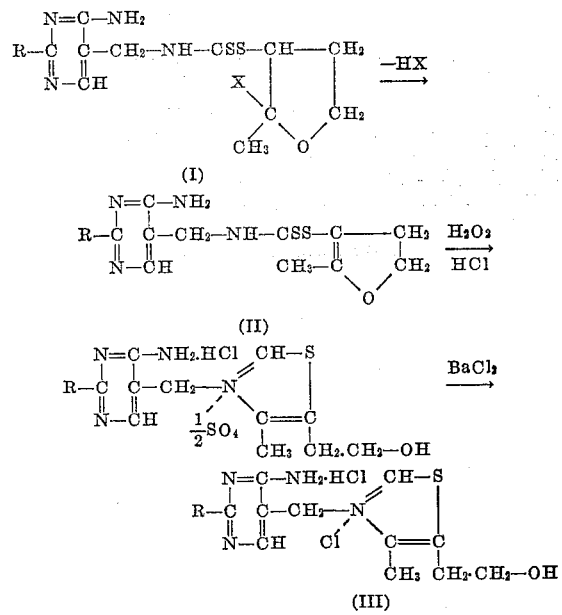

wherein R stands for alkyl group and X for halogen atom.

The compound (I) given above can be obtained by the process hereinafter mentioned and the substance is very susceptible of splitting off hydrogen halide and therefore is difficult to obtain in a pure state; and it is usually contaminated more or less with the compound (II) which has been produced as a result of such decomposition.

The compound (I) is easily converted into the compound (II) either by simple heating or by treating it with a basic substance. The treatment with a basic substance is generally effected by warming it with an alcoholic solution of caustic alkali. The compound (II) is then made to an acid solution, and there is added thereto drop by drop an aqueous hydrogen peroxide solution, whereby an exothermic reaction takes place and thiamine derivative is produced.

For example, one mol of the compound (II) is dissolved in a dilute hydrochloric acid, and after addition of 3 mols of hydrogen peroxide drop by drop to complete the reaction, an aqueous solution of barium chloride is added to the hydrochloric acid solution of thiamine sulphate thus obtained until no more precipitation of barium sulphate takes place. The precipitate is filtered off and the filtrate concentrated under reduced pressure. When hot absolute alcohol is added to the concentrate, hydrochloride of thiamine chloride derivative separates out as a crystalline substance.

The compound (I) used in the process of present invention can be obtained in the following manner.

(a). γ - aceto - α - γ -dihalogenopropane (II) which is obtained in a perfectly pure state from α-aceto-α-halogeno-butyrolactone by treating the same with concentrated hydrochloric acid solution in presence of glacial acetic acid is reacted in presence of an acid-binding agent with 2-alkyl-4-amino-5-aminomethyl-pyrimidine (V) and carbon bisulphide.

(b). A salt of N-[2-alkyl-4-amino-pyrimidyl-(5)]-methyl-dithiocarbamic acid, such as ammonium salt obtained by condensing the compound (V) with carbon bisulphide and ammonia, is reacted in a suitable solvent, such as water and a lower alcohol, with compound (IV) at room temperature or a slightly elevated temperature.

The reactions are illustrated by the following formulae:

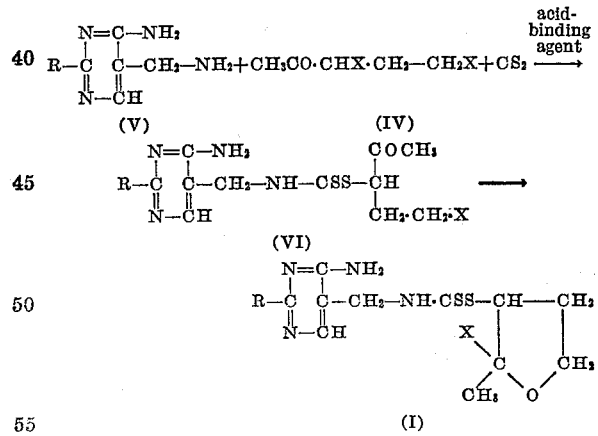

Although the compound (I), according to the above reaction, may seem at first sight to be represented by the formula (VI), the fact is that it does not show an absorption due to carbonyl group in an infra-red ray absorption spectrum, but shows an absorption due to ether-form oxygen atom, and accordingly the formula (I) reasonably should be given to the substance.

Following examples illustrate the invention.

EXAMPLE 1

*Preparation of 2' - methyl - 4':5' - dihydrofuryl-(3') - [2 - methyl - 4 - amino - pyrimidyl-(5')] - methyl - dithiocarbamate*

(a) 3.2 gs. of sodium hydroxide are dissolved in 80 cc. of methanol. 8.4 gs. of 2-methyl-4-amino - 5 - aminomethylpyrimidine are added thereto and the mixture is warmed a short while. Sodium chloride which separates out is filtered off, and the filtrate after being cooled is well mixed with 6.2 gs. of γ-aceto-α·γ-dichloropropane, 4 gs. of aqueous ammonia of 25% strength and 4 gs. of carbon bisulphide. The mixture is heated on a water bath for about 2–3 minutes. When it is cooled, 9 gs. of 2'-methyl - 2' - chlorotetrahydrofuryl - (3') - [2-methyl - 4 - amino - pyrimidyl - (5')] - methyl-dithiocarbamate are separated out as beautiful, colorless, prismatic crystals. The product is sucked off, washed with water and dried. When it is heated under reduced pressure of 100 mm. to the temperature of 90–100° C. for 30 minutes, a vigorous foaming occurs with evolution of hydrogen chloride gas, and there is obtained the product aimed at a quantitative yield as a crystalline powder having a melting point of 176° C.

(b) To a solution of 2.4 gs. of sodium hydroxide in 400 cc. of methanol are added 20 gs. of 2'-methyl-2-chlorotetrahydrofuryl-(3')-[2-methyl-4 - amino - pyrimidyl - (5)] - methyl - dithiocarbamate above obtained. The mixture is heated on a water bath for 20 minutes while stirring. After being cooled, 16.5 gs. of a crystalline substance separate out, which are recovered by filtration and washed with water. The substance is the one which is aimed at and constitutes colourless prismatic crystals having a melting point of 176° C.

EXAMPLE 2

*Preparation of hydrochloride of N - [2' - methyl-4' - amino-pyrimidyl - (5')] - 4 - methyl - 5-β - hydroxyethyl - thiazolium chloride (thiamine hydrochloride)*

10 gs. of 2'-methyl-4':5'-dihydrofuryl-(3')-[2 - methyl - 4 - aminopyrimidyl - (5')] - methyl-dithiocarbamate are dissolved in ten-times quantity of aqueous hydrochloric acid solution of 10% strength. To this solution are added drop by drop 11.5 gs. of aqueous hydrogen peroxide solution of 30% strength. An exothermic reaction takes place. After the reaction is completed, an aqueous solution of barium chloride is added until no more precipitation of barium sulphate occurs. The precipitate is removed by filtration and the filtrate is concentrated under reduced pressure. The residual liquid substance is mixed with hot absolute alcohol. When the mixture is allowed to stand, a crystalline substance separates out which is collected by filtration and recrystallized from an aqueous alcohol. There is thus obtained 9.5 gs. of hydrochloride of N - [2' - methyl - 4' - amino - pyrimidyl-(5')] - methyl - 4 - methyl - 5 - β - hydroxyethyl thiazolium chloride (thiamine hydrochloride).

What we claim is:

1. A process for manufacturing thiamine hydrochloride, comprising the steps of splitting off hydrogen halide from 2'-methyl-2'-halogenotetrahydrofuryl - (3') - [2 - methyl - 4 - aminopyrimidyl - (5)] - methyl - dithiocarbamate to produce 2' - methyl - 4':5' - dihydrofuryl - (3') - [2 - methyl - 4 - amino - pyrimidyl - (5)]-methyl-dithiocarbamate and oxidizing the latter in an acid solution with hydrogen peroxide.

2. A process for manufacturing thiamine hydrochloride according to claim 1, comprising the further steps of reacting the resulting product of claim 1 with an aqueous solution of barium chloride, separating out the resulting precipitate of barium sulphate and crystallizing the thiamine hydrochloride from the residual liquid.

No references cited.